(12) United States Patent
Rauschenbach et al.

(10) Patent No.: US 7,896,768 B2
(45) Date of Patent: Mar. 1, 2011

(54) DRIVE ASSEMBLY FOR AN OPERATING UNIT OF AN AGRICULTURAL IMPLEMENT OR AN AGRICULTURAL MACHINE

(75) Inventors: Stefan Rauschenbach, Großpostwitz (DE); Manfred Eidam, Wilthen (DE); Andreas Roth, Neunkirchen-Seelscheid (DE)

(73) Assignee: GKN Walterscheid Getriebe GmbH (DE)

( * ) Notice: Subject to any disclaimer, the term of this patent is extended or adjusted under 35 U.S.C. 154(b) by 630 days.

(21) Appl. No.: 11/866,563

(22) Filed: Oct. 3, 2007

(65) Prior Publication Data

US 2008/0085802 A1    Apr. 10, 2008

(30) Foreign Application Priority Data

Oct. 5, 2006    (DE) .................. 10 2006 047 577

(51) Int. Cl.
*F16H 47/04* (2006.01)
*F16H 37/02* (2006.01)
*F16H 3/44* (2006.01)
*B60K 17/28* (2006.01)

(52) U.S. Cl. .................. 475/72; 475/218; 475/302; 180/53.4

(58) Field of Classification Search .................. 475/72, 475/83, 84, 218, 343, 302; 74/665 F, 665 G, 74/665 H, 730.1, 15.63; 180/53.4, 53.7, 180/53.8
See application file for complete search history.

(56) References Cited

U.S. PATENT DOCUMENTS

| | | | | |
|---|---|---|---|---|
| 4,138,907 A | | 2/1979 | Melles | |
| 4,259,881 A | * | 4/1981 | Meyerle | 475/72 |
| 4,340,320 A | * | 7/1982 | Moss | 404/122 |
| 5,544,547 A | * | 8/1996 | Ishimaru | 74/730.1 |
| 5,697,264 A | * | 12/1997 | Andrews et al. | 74/665 GB |
| 5,890,981 A | * | 4/1999 | Coutant et al. | 475/72 |
| 6,860,354 B2 | * | 3/2005 | Hasegawa | 180/242 |
| 7,207,916 B2 | * | 4/2007 | Rodeghiero et al. | 475/78 |
| 7,617,892 B2 | * | 11/2009 | Nishimoto et al. | 180/53.4 |
| 2003/0207733 A1 | * | 11/2003 | Ishimaru et al. | 475/83 |
| 2005/0192148 A1 | * | 9/2005 | Hasegawa et al. | 475/72 |

FOREIGN PATENT DOCUMENTS

| | | |
|---|---|---|
| DE | 27 57 300 | 8/1982 |
| DE | 26 33 090 | 1/1983 |
| DE | 39 12 386 | 10/1990 |
| DE | 40 30 050 | 3/1992 |
| EP | 450252 A2 * | 10/1991 ................ 475/72 |
| EP | 1 371 279 | 12/2003 |

(Continued)

*Primary Examiner*—Roger Pang
(74) *Attorney, Agent, or Firm*—Harness, Dickey & Pierce, P.L.C.

(57) ABSTRACT

A drive assembly for an operating unit (9) of an agricultural implement or an agricultural machine has a clutch (4) with an input (34). The input (34) is mechanically and drivingly connected to a drive engine (1). A summarizing gear unit (8) has a first input (20), a second input (24) and an output (26). The first input (20) is mechanically and drivingly connected to an output (35) of the clutch (4). The output (26) acts to drive the operating unit (9). A hydraulic pump (10) is mechanically and drivingly connected to the output (35) of the clutch (4). A hydraulic motor (11) is hydraulically connected to the hydraulic pump (10). The motor (11) is mechanically and drivingly connected to the second input (24) of the summarizing gear unit (8).

11 Claims, 1 Drawing Sheet

FOREIGN PATENT DOCUMENTS

| | | |
|---|---|---|
| EP | 1 382 885 | 1/2004 |
| EP | 1 072 817 | 1/2006 |
| GB | 2 261 039 | 5/1993 |
| UA | RU 2 080 266 | 5/1997 |
| WO | WO 2004/072512 | 8/2004 |
| WO | WO 2006/042434 | 4/2006 |

* cited by examiner

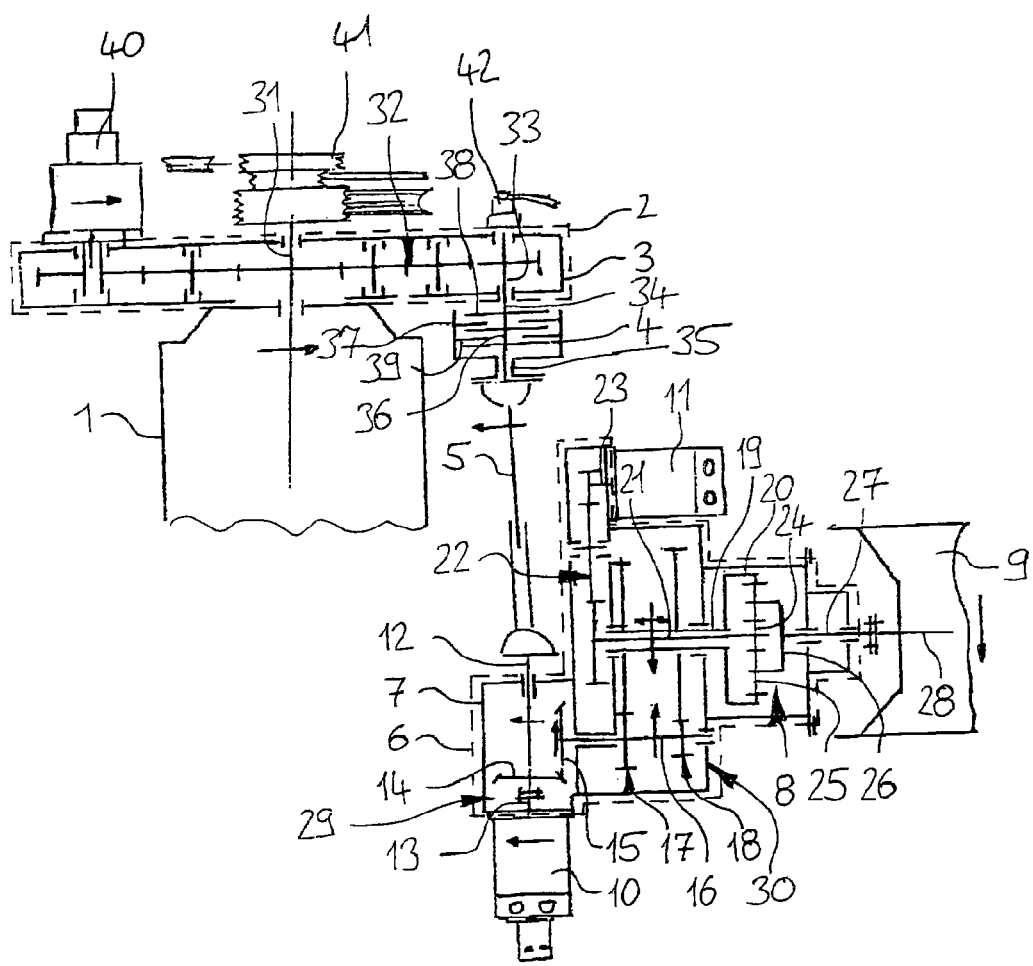

DRIVE ASSEMBLY FOR AN OPERATING UNIT OF AN AGRICULTURAL IMPLEMENT OR AN AGRICULTURAL MACHINE

CROSS-REFERENCE TO RELATED APPLICATION

This application claims priority to German Patent Application No. 102006047577.1, filed Oct. 5, 2006, which application is herein expressly incorporated by reference.

FIELD

The disclosure relates to a drive assembly for an operating unit of an agricultural implement or an agricultural machine having a hydro-mechanical transmission. This operating unit may be, in particular, a threshing rotor of a combine harvester.

BACKGROUND

EP 1,072,817 B1 discloses a hydro-mechanical transmission for an agricultural harvesting machine. Preferably, this is a combine harvester where the hydro-mechanical transmission drives the threshing rotor and enables a continuously variable speed adjustment of the threshing rotor. In this configuration, a clutch is driven by a drive engine. The clutch output is mechanically and drivingly connected to a hydraulic pump. The clutch output is further drivingly connected to a ring gear of a planetary gear set. In addition, the hydraulic pump is hydraulically connected to a hydraulic motor and drives the latter. The planet carrier of the planetary gear set is mechanically and drivably connected to the threshing rotor so as to drive it.

In order to provide a large conversion range the hydraulic pump is designed as a variable-displacement pump. The pump may be adjusted from a negative range of the displacement volume to a positive range of the displacement volume. If the hydraulic pump is operated in the negative range, the individual components of the drive assembly have to transmit idle power. The components need to be sized accordingly. In the hydro-mechanical transmission according to EP 1,072,817 B1, the clutch transmits the idle power so that it is capable of transmitting higher real amounts of power than the useful power.

SUMMARY

It is an object of the present disclosure to provide a drive assembly for an operating unit of an agricultural implement or an agricultural machine where the individual components, in particularly, the clutch may be minimized in size in view of the power transmission capacity.

In accordance with the disclosure, a drive assembly for an operating unit of an agricultural implement or an agricultural machine comprises a clutch having an input. The input may be mechanically and drivingly connected to a drive engine. A summarizing gear unit has a first input, a second input and an output. The first input is mechanically and drivingly connected to an output of the clutch. The output acts to drive the operating unit. A hydraulic pump is mechanically and drivingly connected to the output of the clutch. A hydraulic motor is hydraulically connected to the hydraulic pump. The hydraulic motor is mechanically and drivingly connected to the second input of the summarizing gear unit.

In this drive assembly, idle power, if it occurs, is transmitted in the hydraulic part via the hydraulic connection between the hydraulic pump and the hydraulic motor. In the mechanical part, idle power is merely transmitted via the summarizing gear unit. The clutch and the mechanical connecting components between the clutch and the summarizing gear unit are not located within the flow of idle power. Accordingly, the parts may be dimensioned smaller in view of their power transmission capacities. Also, these component parts are subjected to less stress and therefore have a higher durability.

Preferably, an engine transmission is provided that is drivable by the drive engine. The clutch is secured to a transmission housing of the engine transmission.

Further, an operating unit gearbox may be provided to drive the operating unit and the hydraulic pump. The hydraulic motor may be secured to a gearbox housing of the operating unit gearbox.

The aforesaid design results in extremely short transmission paths for hydraulic power. Thus, the power dissipation can be reduced. However, long transmission paths are accomplished mechanically, by means of a universal-joint shaft between the clutch and the input of the operating unit gearbox. Mechanical transmission over larger distances results, in general, in less power dissipation. Thus, the efficiency of the drive assembly is increased.

In a preferred embodiment, the input of the operating unit gearbox is in the form of an input shaft coaxially arranged to an input shaft of the hydraulic motor. The input of the operating unit gearbox may be in the form of an input shaft. The output of the operating unit gearbox may be in the form of an output shaft. Both shafts are arranged at right angles to each other.

In order to achieve a change of direction of the input shaft of the operating unit gearbox, it may be part of a bevel gear unit. The input shaft of the operating unit gearbox may function directly to drive the hydraulic pump.

In order to obtain a large conversion range, the operating unit gearbox may include a shift transmission drivingly connected to the summarizing gear unit.

In a preferred embodiment, the summarizing gear unit is a planetary gear set with a ring gear, a sun gear and a plurality of planetary gears including a planet carrier. The first input is the ring gear of the planetary gear set. The second input is the sun gear. The output is the planet carrier.

Further areas of applicability will become apparent from the description provided herein. It should be understood that the description and specific examples are intended for purposes of illustration only and are not intended to limit the scope of the present disclosure.

DRAWINGS

A preferred embodiment of a drive assembly will be explained hereinafter in greater detail with reference to the drawing.

DETAILED DESCRIPTION

The following description is merely exemplary in nature and is not intended to limit the present disclosure, application, or uses.

The FIGURE shows a drive engine 1 as the main drive. The drive engine 1 is in the form of an internal combustion engine. The engine 1 is drivingly connected to an engine gearbox 2 with a gearbox housing 3. The engine gearbox 2 drives a clutch 4 which, in turn, drives an operating unit gearbox 6, via a universal-joint shaft 5.

The operating unit gearbox 6 includes a gearbox housing 7. A summarizing gear set in the form of planetary gearing 8 is disposed in the gearbox housing 7. The operating unit gearbox 6 functions to drive an operating unit in the form of a threshing rotor 9 of a combine harvester.

A hydraulic pump 10 and a hydraulic motor 11 are secured to the gearbox housing 7 of the operating unit gearbox 6. Additionally, as will be explained below, the hydraulic pump 10 and motor 11 are mechanically and drivingly connected to the operating unit gearbox 6. Through hydraulic tubes (not shown) the hydraulic pump 10 is hydraulically connected to the hydraulic motor 11 so as to drive the latter.

The operating unit gearbox 6 has an input in the form of an input shaft 12, driven by the universal-joint shaft 5. The input shaft 12 of the operating unit gearbox 6 is directly connected to input shaft 13 of the hydraulic pump 10. Thus, the input shaft 12 of operating unit gearbox 6 and input shaft 13 of the hydraulic pump 10 are coaxially arranged with respect to one another. The input shafts 12 and 13 are connected without a speed increasing or decreasing ratio.

The input shaft 12 of operating unit gearbox 6 includes a rotationally fixed first bevel gear 14. The first bevel game 14 drives a second bevel gear 15 located on a countershaft 16. The bevel gears 14, 15 form a bevel gear set 29. The countershaft 16 is arranged at a right angle to the input shaft 12 of the operating unit gearbox 6.

The bevel gear set 29 is connected to a shift transmission 30. The countershaft 16 extends into the shift transmission 30 and drives a first power take-off shaft 19, via either a first gear set 17 or a second gear set 18. Each gear set 17, 18 has a different transmission ratio. The first power take-off shaft 19 is connected to a ring gear 20 (first input) of the planetary gearing 8. The first power take-off shaft 19 is in the form of a hollow shaft accommodating a second output shaft 21 rotatably arranged in its center. The second power take-off shaft 21 is drivingly connected to an output shaft 23 of the hydraulic drive 11, via a transmission gearing 22. The transmission gearing 22 has a plurality of spur gears. Here, the output shaft 23 of hydraulic motor 11 and the second power take-off shaft 21 are parallel to each other. A sun gear 24 (second input) of planetary gearing 8 is driven via the second power take-off shaft 21.

The planetary gearing 8 further includes a plurality of planetary gears 25 arranged between the ring gear 20 and the sun gear 24. The planetary gears 25 are rotatably secured to a planet carrier 26. The planet carrier 26 has an output shaft 27. The output shaft 27 is the output of planetary gearing 8. The output shaft 27 functions to rotatably drive the threshing rotor 9 of the combine harvester about a rotational axis 28. Here, the output shaft 27 is coaxially arranged along the rotational axis 28 of the threshing rotor 9.

The operating unit gearbox 6 include the bevel gear set 29, the shift transmission 30 including the transmission gearing 22, and the planetary gearing 8. The bevel gear set 29 causes input shaft 12 and output shaft 27, of the operating unit gearbox 6, to be arranged at a right angle to each other. Likewise, input shaft 13 of hydraulic pump 10 and output shaft 23 of hydraulic motor 11 are disposed at a right angle to each other. In a different gear system assembly, it is possible to rearrange the hydraulic pump 10 and the hydraulic motor 11 with respect to each other. Here, the input shaft 13 of hydraulic pump 10 and the output shaft 23 of hydraulic motor 11 are directed away from each other and are coaxially arranged with respect to each other. The hydraulic pump 10 and the hydraulic motor 11 are located adjacent to each other (back-to-back configuration). This measure helps to avoid long flexible hydraulic tubes which cause large power dissipation.

The drive engine 1 is drivingly connected to an input shaft 31 of the engine transmission 2. The input shaft 31 of the engine transmission 2 drives an output shaft 33 of the engine transmission 2, via transmission gearing 32. The transmission gearing 32 has a plurality of spur gears and intermediate shafts. Output shaft 33, of engine transmission 2, is connected to an input 34 of clutch 4. An output 35 of clutch 4 is drivingly connected to universal-joint shaft 5 to drive it.

Clutch 4 is in the form of a multi-plate clutch. An inner clutch member 36 accommodates inner plates 38. An outer clutch member 37 accommodates outer plates 39. Clutch hub 36 acts as an input 34 of the clutch 4 in this case. The outer clutch member 37 acts as the output 35 of the clutch 4. A clutch housing (not shown here) is secured and rotationally fixed to the transmission housing 3 of engine gearbox 2.

The engine transmission 2 further acts to drive other operating units or mechanical drive units such as generators 40, belt drives 41 or hydraulic pumps of further components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive assembly for an operating unit of an agricultural implement or an agricultural machine, comprising:
    an engine gearbox drivingly connected to a drive engine;
    a clutch having an input, said input being mechanically and drivingly connected to the drive engine via the engine gearbox, the clutch having a power takeoff output;
    an operating unit gearbox for driving an operating unit, the operating unit gearbox being driven by the clutch and being separate from the engine gearbox;
    a summarizing gear unit having a first input, a second input and an output, said first input is mechanically and drivingly connected to the power takeoff output of the clutch and the clutch power takeoff output acts to drive the operating unit;
    a hydraulic pump is mechanically and drivingly connected to the power takeoff output of the clutch; and
    a hydraulic motor is hydraulically connected to the hydraulic pump and mechanically and drivingly connected to the second input of the summarizing gear unit.

2. The drive assembly according to claim 1, further comprising an engine transmission drivable by the drive engine, and said clutch is secured to a transmission housing of the engine transmission.

3. The drive assembly according to claim 1, further comprising an operating unit gearbox for driving the operating unit and said hydraulic pump and said hydraulic motor are secured to a gearbox housing of said operating unit gearbox.

4. The drive assembly according to claim 3, wherein the power takeoff output of the clutch and an input of said operating unit gearbox are drivingly connected to each other via a universal-joint shaft.

5. The drive assembly according to claim 4, wherein the input of the operating unit gearbox is coaxially arranged to an input shaft of said hydraulic pump.

6. The drive assembly according to claim 4, wherein the input of said operating unit gearbox is an input shaft and the output of said operating unit gearbox is an output shaft with the input shaft and the output shaft arranged at a right angle to each other.

7. The drive assembly according to claim 6, wherein the input shaft of the operating unit gearbox is part of a bevel gear set.

8. The drive assembly according claim 6, wherein the input shaft of the operating unit gearbox drives the hydraulic pump.

9. The drive assembly according to claim 3, wherein the operating unit gearbox comprises a shift transmission drivingly connected to the summarizing gear unit.

10. The drive assembly according to claim 1, wherein the summarizing gear unit is a planetary gearing having a ring gear, a sun gear and a plurality of planetary gears having a planet carrier.

11. The drive assembly according to claim 10, wherein the first input is the ring gear of the planetary gearing, the second input is the sun gear and the output is the planet carrier.

* * * * *